(12) United States Patent
Sahines et al.

(10) Patent No.: US 6,652,475 B1
(45) Date of Patent: Nov. 25, 2003

(54) AUTOMATED BLOOD COMPONENT SEPARATION SYSTEM

(75) Inventors: Thomas P. Sahines, Milpitas, CA (US); Robert K. Fernandez, Campbell, CA (US); Herbert W. Hoeptner III, Gilroy, CA (US); Thomas C. Robinson, Oakland, CA (US); Rahl E. Hoeptner, Morgan Hill, CA (US)

(73) Assignee: Mission Medical, Inc., Fremont, CA (US)

( * ) Notice: Subject to any disclaimer, the term of this patent is extended or adjusted under 35 U.S.C. 154(b) by 137 days.

(21) Appl. No.: 09/612,347

(22) Filed: Jul. 6, 2000

Related U.S. Application Data

(60) Provisional application No. 60/143,036, filed on Jul. 7, 1999.

(51) Int. Cl.⁷ .............................. A61M 37/00; C02F 1/38
(52) U.S. Cl. .................. 604/6.01; 604/6.15; 210/787
(58) Field of Search .................. 210/645, 745, 210/782, 783, 757; 604/5.01, 6.01, 6.15; 490/437

(56) References Cited

U.S. PATENT DOCUMENTS

| 4,322,298 A | * | 3/1982 | Persidsky ................... 210/516 |
|---|---|---|---|
| 5,154,716 A | * | 10/1992 | Bauman et al. ............. 210/767 |
| 5,300,060 A | | 4/1994 | Nelson |
| 5,456,845 A | | 10/1995 | Nishimura et al. |
| 5,632,906 A | | 5/1997 | Ishida et al. |
| 5,656,154 A | | 8/1997 | Meryman |
| 5,723,050 A | | 3/1998 | Unger et al. |
| 5,779,660 A | * | 7/1998 | Kingsley et al. ............. 210/645 |
| 6,106,727 A | * | 8/2000 | Krasnoff et al. ............. 210/109 |
| 6,296,602 B1 | * | 10/2001 | Headley ....................... 494/10 |

\* cited by examiner

*Primary Examiner*—Angela D. Sykes
*Assistant Examiner*—Leslie R. Deak
(74) *Attorney, Agent, or Firm*—Pillsbury Winthrop LLP

(57) ABSTRACT

An automatic system and method for the separation of blood into component parts includes a conically shaped collection and separation bag, component bags connected to the collection and separation bag, a sensor, valves to seal the connections between the component bags and the collection and separation bag, a centrifuge and a controller for controlling the process. Blood is placed in the collection and separation bag and is separated by centrifuging. The components are removed from the collection and separation bag either directly or indirectly by the centrifugal force into the component bags. Flow of the components is directed by automatic opening and closing of the valves in response to the position of the interface between the separated components determined by the sensor or elapsed time.

24 Claims, 6 Drawing Sheets

AUTOMATED BLOOD COMPONENT SEPARATION SYSTEM

CROSS-REFERENCE TO RELATED APPLICATION

This application claims the benefit of U.S. Provisional Patent Application No. 60/143036, filed Jul. 7, 1999.

BACKGROUND OF THE INVENTION

The invention relates to a fully automatic, closed and sterile system for performing whole blood separation and component removal in a centrifugal field and for performing addition of storage solution.

The currently used manual methods used for separating components from a unit of whole blood are labor-intensive, lengthy, and costly. The current primary method for separating whole blood into components is to centrifuge the blood bag in order to separate plasma from red cells. A "soft" spin at moderate centrifuge speeds results in a platelet-rich plasma. The bag is removed from the centrifuge and a bag flat-plate press is used to manually expel separated plasma from the blood bag into another bag. This second bag may then be spun in the centrifuge to separate platelets from plasma. A bag press is used to express platelet-poor plasma into a third bag, retaining platelet-rich plasma in the second bag.

An alternative procedure uses a "hard" spin or higher centrifuge speed of the blood bag to separate blood into red cells, platelet-poor plasma, and a buffy coat between the red cells and plasma that contains most of the white cells and platelets. As with the "soft" spin method, however, the plasma is manually expelled into another bag using a bag flat-plate press. The bag press is used again to expel the buffy coat into a third bag, and a separate process is used to separate the platelets from the buffy coat. "Hard" and "soft" spins are terms well-understood in the art—although the revolutions per minute associated with hard or soft spins varies with the size of the centrifuge. In many centrifuges used in blood separation procedures, a "soft" spin is achieved at approximately 3000 rpm while a "hard" spin is achieved at between 5000–6000 rpm.

Both of the above procedures can also result in red cell contamination of plasma and platelets. The procedures can also result in higher than desirable white cell and platelet concentrations in the red cells and higher than desirable white cell concentration in the platelets.

It is generally desirable to wash concentrated red cells, such as those produced by the Blood Processing System, U.S. patent application Ser. No. 09/419,216, which is incorporated by reference herein, in a wash solution that increases the shelf life of the cells. The wash solution is added to the red cells, mixed, and centrifuged to separate the excess solution from the cells. The excess wash solution is then removed. However, manual methods for washing red cells within a closed system use a sterile connection (sterile docking) to introduce and remove wash solution between centrifugal cycles, which is labor-intensive and costly. As a result, the addition of a washing step prior to storage cannot be justified economically, even if the result was a doubling of shelf life.

An alternative is to mix the concentrated red cells with a long-term storage solution without washing. One current solution uses hundred milliliters of additive to a unit of concentrated red cells and can provide up to six weeks of refrigerated storage. In automatic processes the long-term storage solution may be utilized without sterile docking procedures, reducing the cost of the procedure to an acceptable level.

It is therefore an object of the invention to provide a completely automated apparatus and method that separates whole blood into blood components with a high degree of reproducible quality and consistency, reducing or eliminating component cross-contamination. It is a further object of the invention to reduce user set-up time, processing time, and removal time with safe operation. It is a further object of the invention to utilize standard centrifuges modifications and allow the user to select a variety of automatic processes and options without hardware modifications, since blood banks have limited space and require equipment to be heavily used and versatile. It is a further object of the invention to provide disposables (i.e., bag sets) for use in the process that are equivalent in cost or less expensive than those used in current procedures.

SUMMARY OF THE INVENTION

The current invention embodies a device and methods for removal of components of blood within a centrifuge that is used for separation of those components. Components may be removed to satellite bags during the centrifugation using the force created by the centrifugal field either as a result of pressure differentials created directly by the centrifugal field or by means of a weighted expresser pushed against the bag by the force. Specially designed tapered, conical bags allow a very sharp separation between components to be maintained and prevent, or significantly reduce, remixing of components during the removal process. Detectors, such as optical detectors, arc used to distinguish between the components—red cells, platelets or buffy coat, and plasma—and provide the input that allows the generation of control signals that open and close tubing pinch valves that direct the component flow to the appropriate component bag.

Other features and advantages of the current invention will appear from the following description in which the preferred embodiments have been set forth in detail in conjunction with the accompanying drawings.

DETAILED DESCRIPTION OF THE DRAWINGS

Figure 1:
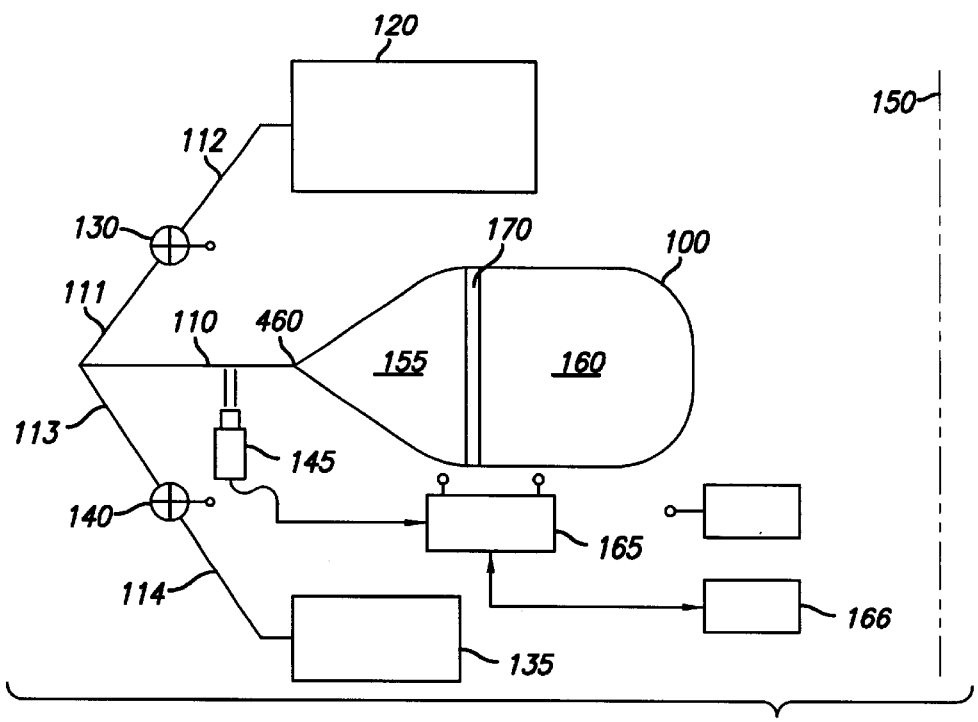
FIG. 1 shows a schematic representation of the first embodiment of the invention wherein components are removed to component bags during centrifugation and the resulting content of component bags after a soft spin procedure.

With reference to FIG. 1, a collection and separation bag 100 is connected to tubing segment 110 which is in turn connected in a "Y" connection to tubing segments 111 and 113. Tubing segment 111 is connected to a first component bag 120 that may contain conventional long term storage solution. Tubing segment 113 is connected to a second component bag 135. Bags 120 and 135 can be conventional bags known in the art, used for storage of blood components. As shown, bags 120, 135 are placed further from the axis of rotation than the collection and separation bag to ensure proper flow of components.

Electromechanical pinch valves 130 and 140 positioned on the tubing segments 111, 113 allow the tubing segments to be selectively pinched closed, thus sealing off the collection and separation bag 100 from the first bag 120 and the second bag 135, and the first and second bag to be sealed off from the collection and storage bag and from each other. It will be understood that tubing segments 110, 111 and 113 may be of unitary construction.

An optical sensor 145 is positioned on the tubing 110 near the connection to the opening of the collection and separation bag 100. The sensor 145 must be able to distinguish between the various components, i.e., red cells, platelets, buffy coat, and plasma. While optical detectors have been proved capable of distinguishing between blood components, it will be understood that other detectors that can distinguish between components, for example, sonic detectors, could be used.

A conventional microprocessor-based controller developed for use with blood processing systems and similar products is used to provide the control logic for system operation and to automate all process steps. The controller 165 may be operably coupled to a control panel (not shown) and the optical sensor 145, and can control the pinch valves 130, 140, and may also be connected to and control the centrifuge speed, via signal terminals according to the particular programming associated with the process selected by the operator of the system.

The entire disposable set comprising the collection and separation bag 100, the tubing segments 110, 111, 113, and the first and second component bags 120, 135 are positioned in a centrifuge so that the tapered end of the collection and separation bag 100, which contains the opening 460, is directed away from the axis of rotation 150.

To separate red blood cells, platelets, and platelet-poor plasma into separate bags the following procedure may be used with the device shown in FIG. 1. Blood is placed into the collection and separation bag using conventional means or by using an attachment tube described in connection with the second embodiment of the invention as shown in FIGS. 5–8. Bag 120 may contain conventional storage solution. Valves 130, 140 are in the closed position. As a first step, the disposable is subjected to a "soft" spin around axis 150 which results in the separation of the whole blood in the collection bag into red cells 155 and platelet rich plasma 160 separated by a layer of leukocytes 170. While maintaining the centrifugal field, valve 130 is opened and the red cells 155 move by means of centrifugal forces into first component bag 120. When the optical sensor 145 detects the end of the red blood cells, valve 130 is automatically closed by the controller 165. As a result, the leukocytes are trapped in tubing 111 near valve 130. The disposable is then subjected to a "hard" spin which results in the separation of the platelet rich plasma into platelets and platelet poor plasma. While maintaining a centrifugal field, Valve 140 is opened allowing the platelets to flow into second component bag 135 by means of centrifugal force. As the optical detector detects the end of the platelets, valve 140 is closed, leaving platelet poor plasma in the collection bag 100.

Figure 2:
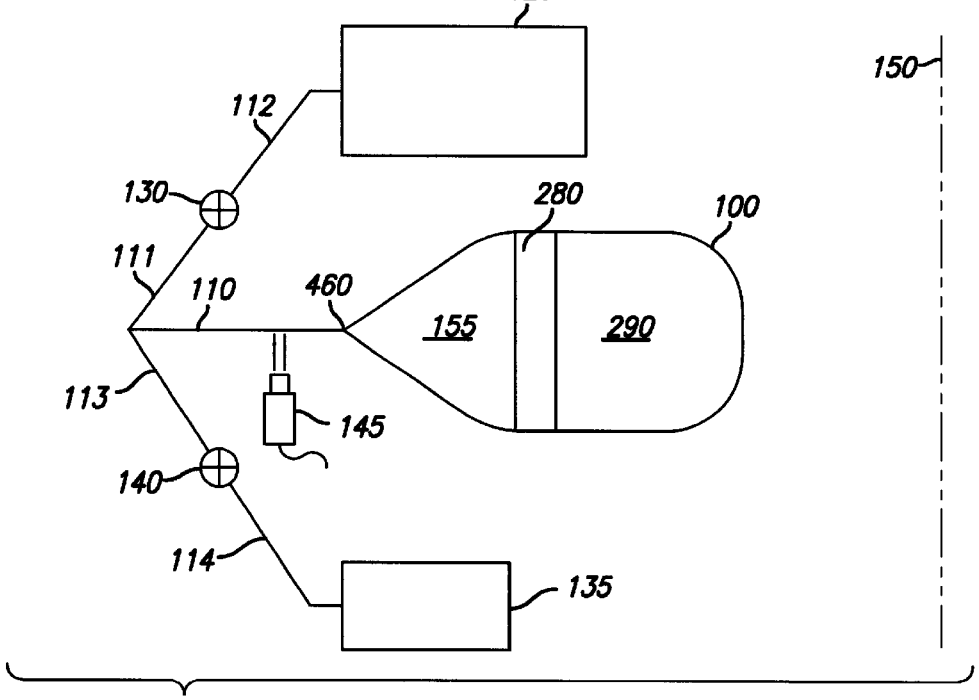
FIG. 2 shows a schematic representation of the first embodiment of the invention and the resulting content of component bags after a hard spin procedure.

An alternative procedure using the same basic mechanical structure is shown in FIG. 2. As in the process described in connection with FIG. 1, blood is placed into the collection and storage bag 100 and bag 120 may contain storage solution. Valves 130, 140 are in the closed position. In this process, the disposables are subjected to a hard spin resulting in the separation of the blood into red blood cells 155, a buffy coat 280 and platelet poor plasma 290. While maintaining a centrifugal field, valve 130 is opened allowing the red blood cells to flow into bag 120 by means of centrifugal force. As sensor 145 detects the end of the red blood cells, valve 130 is closed and valve 140 is opened allowing the buffy coat 280 to flow into bag 135 by means of centrifugal forces. As sensor 145 detects the end of the buffy coat, valve 140 closes leaving platelet poor plasma in the collection bag 100.

Figure 3:
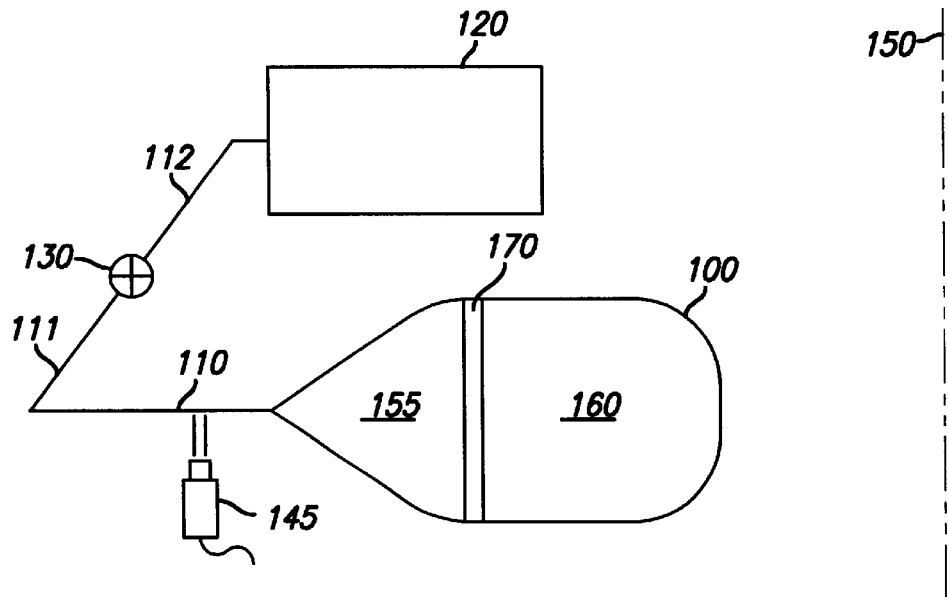
FIG. 3 shows a schematic representation of the first embodiment of the invention and the resulting content of component bags after a hard spin procedure.

A third alternative procedure may be used with the same basic mechanical structure, as shown in FIG. 3. This process requires the use of only the first component bag 120, although this can be achieved with the basic structure shown in FIGS. 1 and 2 by keeping the valve 140 closed. In this process, plasma depleted whole blood, which may be obtained from a variety of methods including that described in Blood Processing System, U.S. patent application Ser. No. 09/419,216, is placed in the blood collection and storage bag 100. The disposables are then subjected to either a hard or moderate spin, separating the blood into red blood cells, platelets, and leukocytes. While maintaining a centrifugal field, valve 130 is opened allowing the red blood cells 155 to move by means of centrifugal forces into the bag 120, which may contain storage solution. As the sensor 145 detects the end of the red blood cells, valve 130 closes leaving platelets and leukocytes in the collection bag 100 and the tubing 110 along with plasma.

A second embodiment of the invention is shown in FIGS. 5–10. This alternative design again utilizes a tapered storage and separation bag 500. The basic configuration of collection and separation bag 500, standard component bags 520, 535 for storage of platelets, red cells or other components as appropriate, tubing segments 510, 511, 512, 513, 514 valves 530, 540 and sensor 545 is essentially the same as in the first embodiment. However, the exit port of the bag 560 is positioned within the centrifugal field to face toward the axis of rotation 550, and rather than utilize the centrifugal forces directly to create flow, this embodiment utilizes a conical weight or expresser 970 to remove the blood components. This results in the red cells being removed first, reducing the potential contamination of platelets by red cells that may remain in tubing or in creases or folds of the separation bag in the first embodiment. As further described below in connection with FIGS. 9 and 10, the centrifugal field forces the expresser (not shown in FIGS. 5–8) against the bag 500, inducing the pressure within the separation bag that causes the components to flow from the separation bag 500 to the component bags 520, 535.

Figure 7:
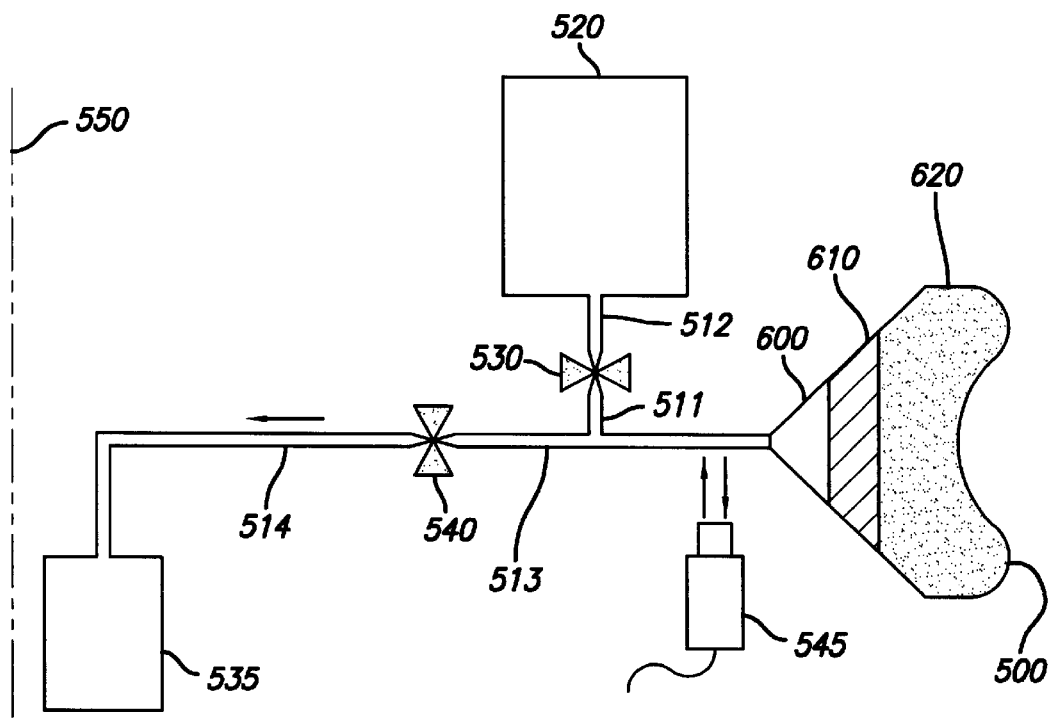
FIG. 7 shows a schematic representation of the second embodiment as the separation bag is compressed and the platelets and plasma are removed.
Figure 8:
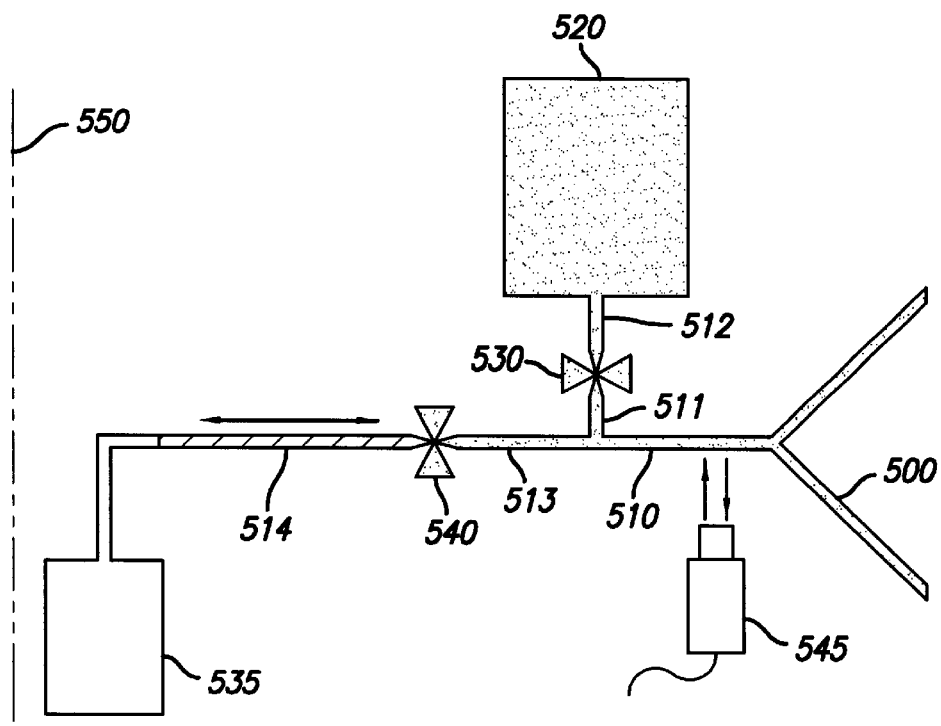
FIG. 8 shows a schematic representation of the second embodiment at the end of the process.

FIGS. 5–8 illustrate schematically how the process of separation is performed using the second embodiment. Either whole blood, or preferably, plasma depleted whole blood, which may be obtained from a variety of methods including that described in Blood Processing System, U.S. patent application Ser. No. 09/419,216, is placed in the blood collection and storage bag 500. Optionally, an attachment tube 590 may be connected to the tubing 510 near the connection between the collection and separation bag 500 and the tubing 510. With both valves 530 and 540 closed, the attachment tube 590 allows the introduction of plasma depleted whole blood into the collection and separation bag 500. The connection tube 590 is then sealed. The disposables are subjected to either a hard or moderate spin for some minutes, separating the blood into red blood cells 620, platelets 600, and leukocytes 610, each of which contains a certain amount of plasma. If a platelet storage solution has been added to the red cells prior to their placement in the collection and separation bag 500 (i.e., as a part of the plasma depletion process), some of this solution may also be mixed with each of the components. As illustrated in FIG. 7, the centrifugal field is maintained and valve 540 is opened allowing the bag 535, to fill with platelets and plasma. As the sensor 545 detects the leukocyte/red cells interface, valve 540 is closed leaving platelets and plasma in component bag 535 and leukocytes trapped in the tubing 514 between the valve 540 and the collection bag 535. Valve 530 is now opened, as shown in FIG. 8, and the separation bag 500 is completely emptied, with the red cells flowing into component bag 520. As in the first embodiment, the component bag intended for the storage of the red cells may have previously been partially filled with long term storage solution. After a duration of time that assures the collection and separation bag 500 has been completely emptied, the centrifuge is rapidly stopped, the bags 500, 520, 535 are removed from the centrifuge and sealed.

Figure 9:
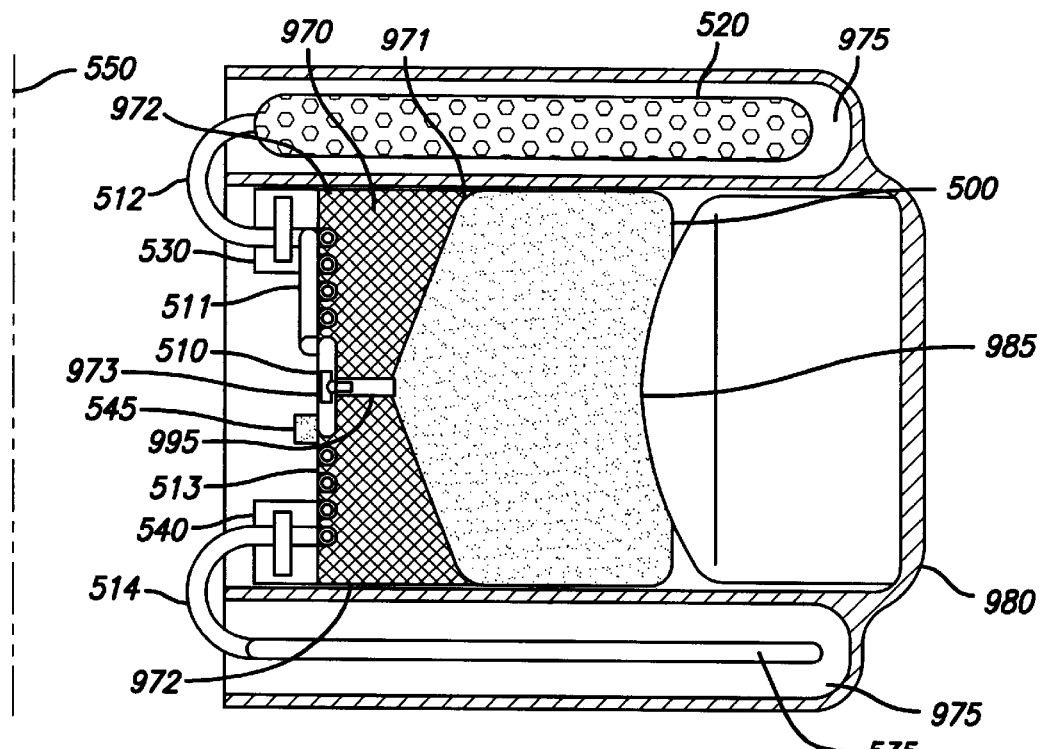
FIG. 9 shows the second embodiment of the invention before separation and component removal.
Figure 10:
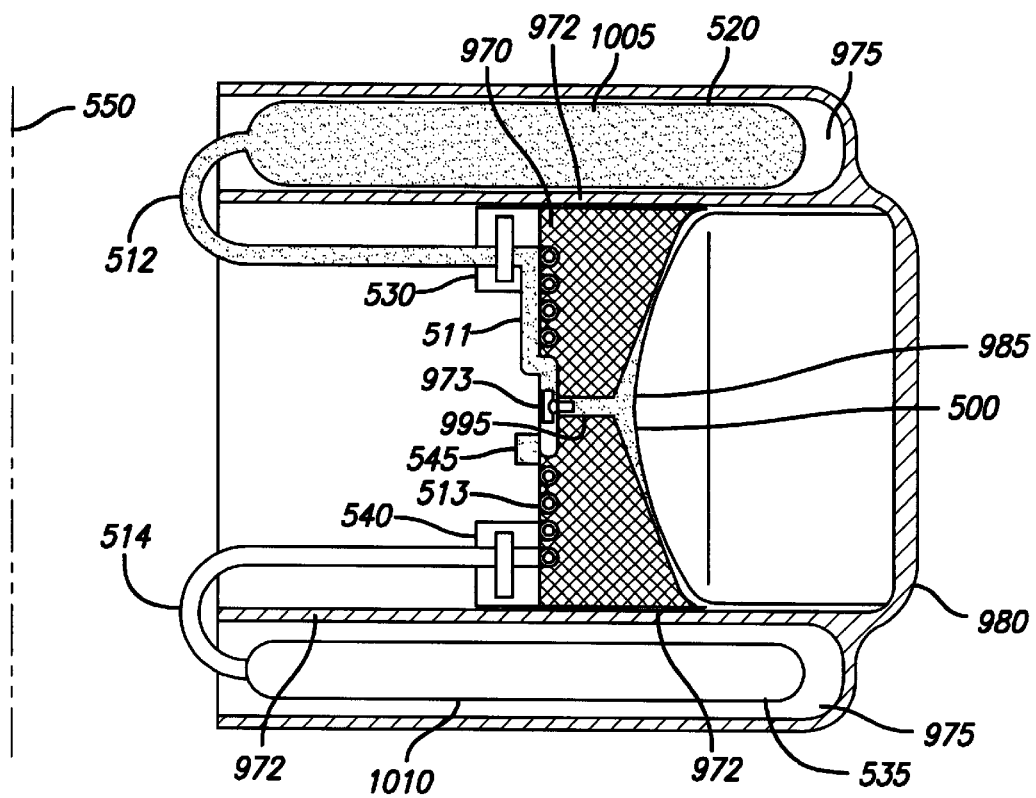
FIG. 10 shows the second embodiment of the invention after separation and component removal.

FIGS. 9 and 10 show the design of the assembly which may be placed into a standard centrifuge, to implement the second embodiment of the invention. FIG. 9 shows the device prior to removal of the components, with both valves 530, 540 closed. The expresser 970 has a portion 971 that matches the shape of the tapered end of the separation bag 500 and that is placed against the tapered end of the bag. The external shape of the expresser 972 fits closely into the interior of the centrifuge cup 980, but when subjected to appropriate centrifugal force is able to move toward the bottom of the centrifuge cup 985 that supports the collection and separation bag. The collection and separation bag 500 is supported in the centrifuge cup 980, which also includes separate bag pockets 975 to support the component bags 520, 535. The interior of that portion of the centrifuge cup 985 that supports the collection and separation bag 500 is also shaped to approximately follow the contour of the expresser 970. Tubing 510 connects the collection and separation bag 500 to the component bag 520, used for red cell storage via tubing segment 511, 512 which are capable of being sealed by one or more electromechanical valves 530. Tubing 510 also connects the collection and separation bag 500 to the component bag 535, used for platelet storage, via tubing segment 513, 514 which are also capable of being sealed by one or more electromechanical valves 540. The lengths of tubing segment portions 511, 512, 513, 514 may be spirally wound on the exterior surface of the expresser 973 and are of sufficient lengths to allow the expresser 970 to fully compress the collection and separation bag against the interior of the centrifuge cup 985. Tubing segments 512, 514 are of sufficient length to allow all leukocytes to be trapped in the tubing. The expresser 970 forms a split or gap 995 that allows the tubing 510 to be easily removed. An optical or other appropriate type of sensor 545 is placed on the exterior portion of the expresser 973, such that it can determine when an interface between components occurs in tubing 510, or alternatively in tubing segment portions 511, 513.

Before and during separation, as shown in FIG. 9, valves 530, 540 are closed. Component bag 520 may contain red cell storage solution. While the centrifuge spin occurs, the expresser 970 is forced by centrifugal force against the collection and separation bag 500, compressing the bag against the interior of the centrifuge cup 985, but does not fully compress the bag as long as the valves 530, 540 remain closed. Once separation has occurred, as described in connection with FIGS. 5–8, valve 530 can be opened while the centrifuge spin is maintained, allowing the expresser 970 to more fully compress the collection and separation bag 500 and forcing platelets 1010 into component bag 535, as shown in FIG. 10. Once the sensor 545 detects the interface of the leukocytes and the red blood cells, a controller and associated electronic control logic (not shown) signals valve 540 to close and valve 530 to open. Expresser 970 thus continues to fully compress the collection and separation bag 500 against the interior of the centrifuge cup 985, and red cells 1005 are forced into component bag 520. As in the first embodiment, the controller may be used to control the entire process.

Figure 11:
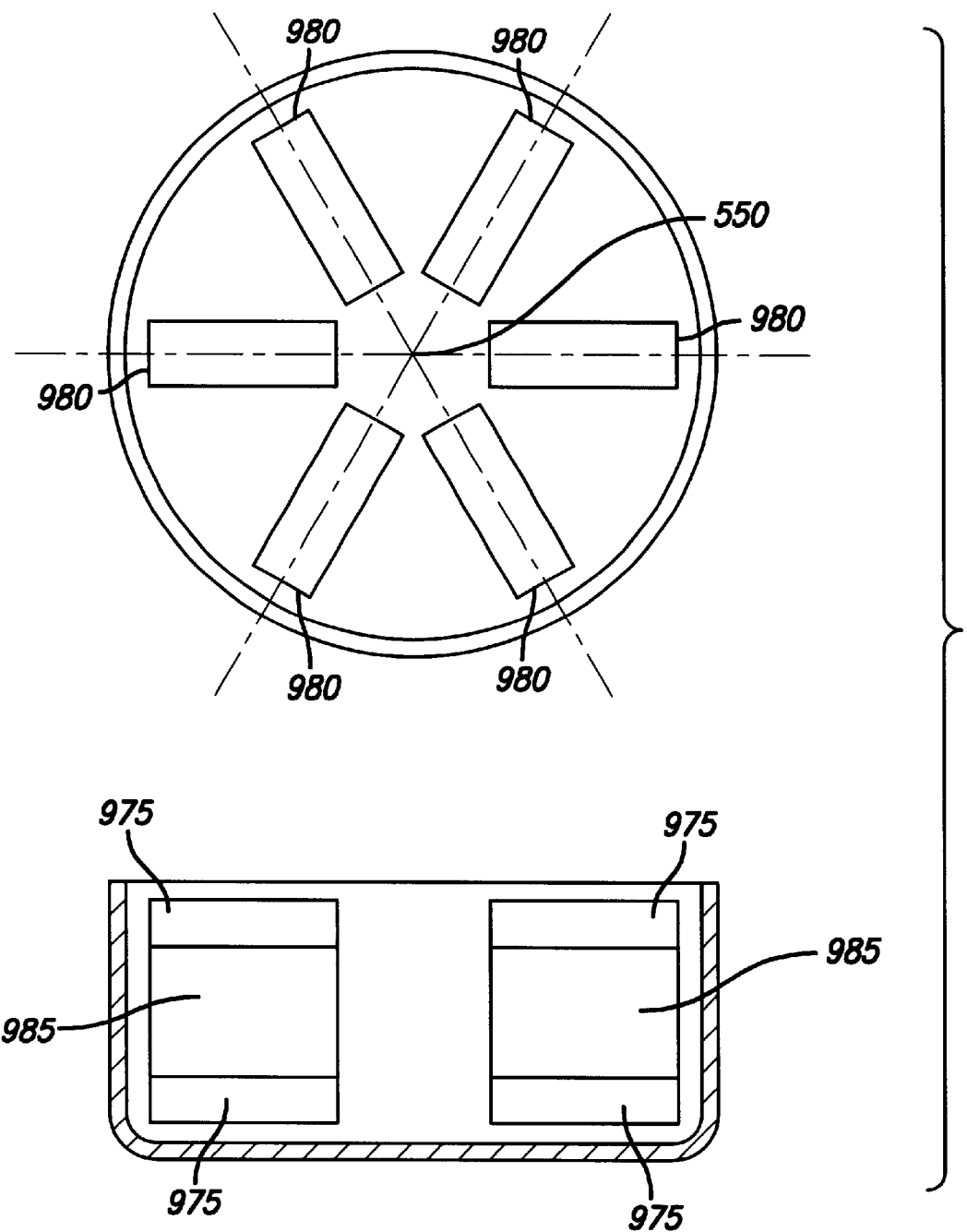
FIG. 11 shows a schematic representation of a centrifuge support structure for the second embodiment of the invention.

With reference to FIG. 11, a schematic of a conventional centrifuge is shown illustrating the positioning of the centrifuge structure for support of the disposables described above. The interior of the centrifuge cups 985 are positioned away from the axis of rotation, and each support structure includes a cup 980 for supporting the collection and separation bag and two adjacent pockets 975 for supporting the component bags. A new rotor for processing four or more units at one time may be used in existing centrifuges to lower initial hardware costs.

Figure 4:
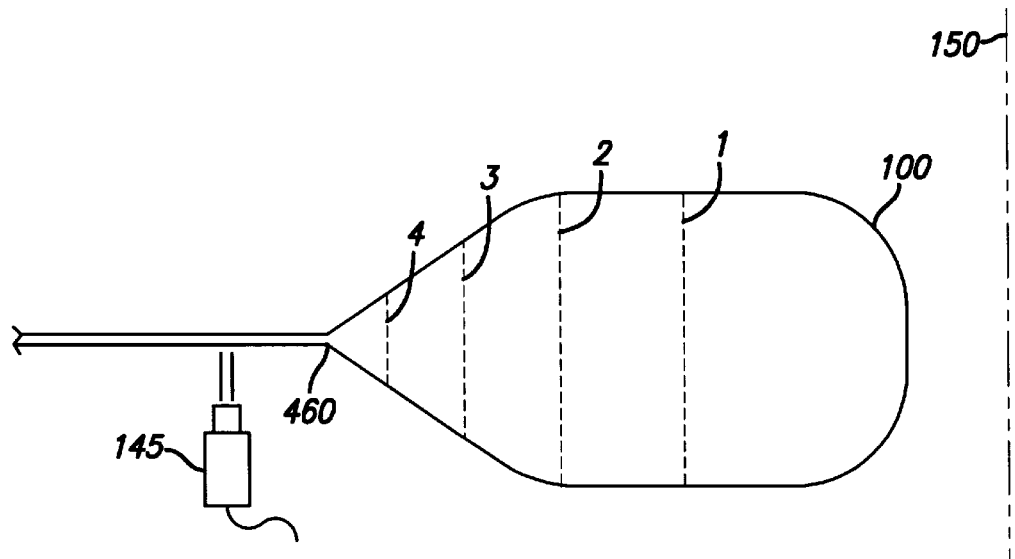
FIG. 4 shows the separation bag used in the first embodiment shown in FIGS. 1–3.
Figure 5:
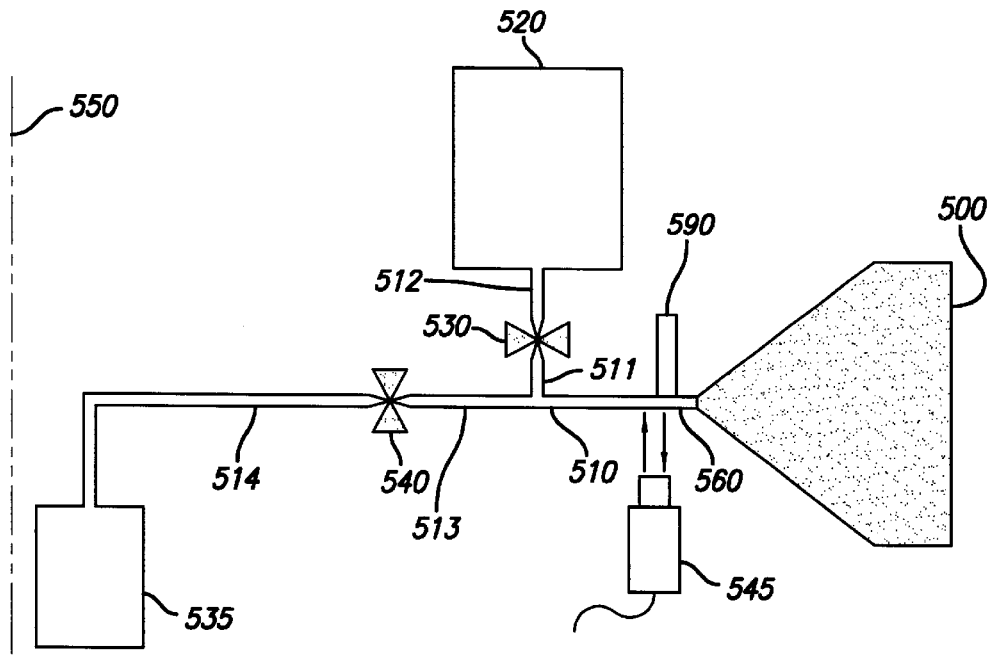
FIG. 5 shows a schematic representation of the second embodiment of the invention wherein components are removed using a weighted expresser as used in separating whole blood or plasma depleted blood into red cells, platelets, and leukocytes with platelet removal first.
Figure 6:
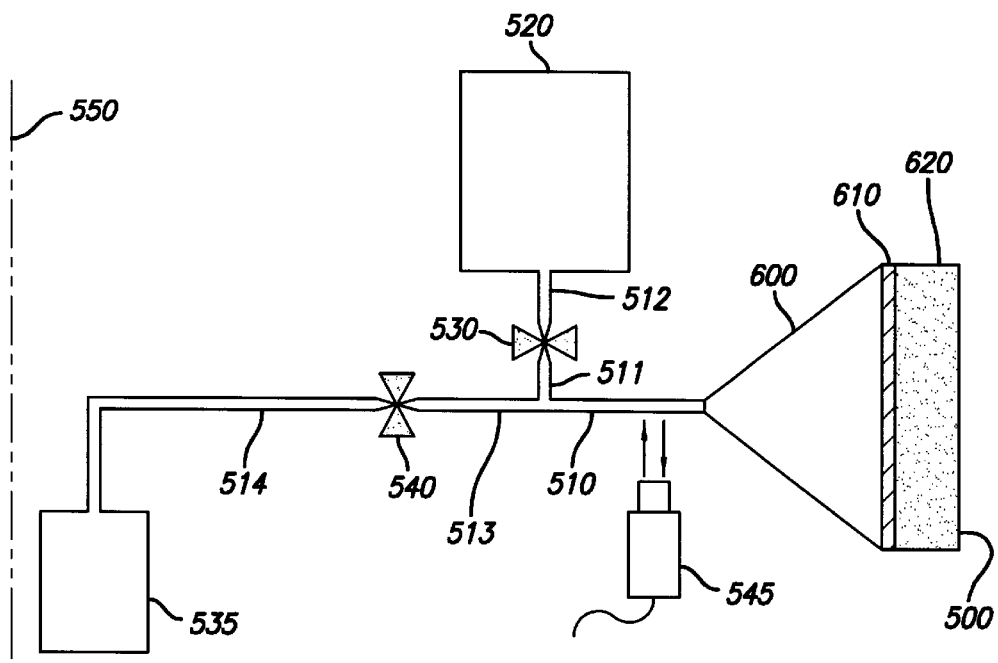
FIG. 6 shows a schematic representation of the second embodiment after the blood is separated by centrifugation into red cells, platelets and plasma, and leukocytes.

Both of the embodiments described remove components while a centrifugal field is maintained. This has the advantage of allowing a sharp interface to be maintained between the components, for example, between the red cells and plasma. As shown in FIG. 4, which shows the collection and separation bag in use in the embodiment described in FIGS. 1–3, in contrast to conventional removal techniques, even as the interface advances from points 1 to 4, toward the exit 460 of the collection and separation bag 100, the centrifugal field prevents remixing and/or keeps remixing at a small, localized area at the interface, and additionally, tends to separate any remixed components. In addition, both embodiments use a collection and separation bag 100, 500 that has a tapered shape such that the bag narrows to the approximate diameter of the tubing segment 110, 510 where it is connected to such tubing segment. The tapered shape allows the component layers to be extended axially (with respect to the collection and separation bag axis 450) during removal of the components, decreasing the possibility of remixing. The process also uses a relatively slow withdrawal of the components at approximately 20 to 60 seconds per unit, which also tends to reduce the possibility of remixing.

As used herein, blood typically includes whole, blood, concentrated red blood cells, glycerolized blood and other blood products including a substantial portion of red blood cells.

While preferred embodiments of the present invention are described above and in the following claims, it is contemplated that various modifications may be made without departing from the spirit and scope of the invention. For example, with minor changes to the initial blood product and/or the solution in the component bag the apparatus might be used to automate red cell washing. Additionally, different types of valves, sensors, and similar components could be used without affecting the basic operation of the device.

What is claimed is:

1. An automated blood component separation system comprising:
   a collection and separation bag suitable for containing blood, forming an opening such that blood may be introduced into the collection and separation bag and removed from the collection and separation bag, said collection and separation bag having a conical shape that tapers toward said opening and further defining a line of symmetry;
   a first component bag suitable for containing a component of blood, forming an opening;
   tubing connected between the opening of the collection and separation bag to the opening of the component bag, said tubing comprising a first and second tubing segment wherein the first tubing segment is connected between the opening of the collection and separation bag and the second tubing segment, and the second tubing segment is connected between the first tubing segment and the opening of the first component bag;
   a first valve aligned with the second tubing segment selectively controllable to seal the second tubing segment when the first valve is in a closed position and unseal the second tubing segment when the first valve is in an open position;
   a sensor capable of detecting an interface between separated components of blood positioned along the first tubing segment near the opening of the collection and separation bag;
   a centrifuge, comprising a support structure that forms at least one cup appropriate for supporting the collection and separation bag such that the opening of the collection and separation bag is directed away from the axis of rotation, and at least one adjacent pocket suitable for supporting the first component bag such that the first component bag is positioned substantially further from the axis of rotation than the collection and separation bag, said centrifuge capable of creating a centrifugal field around an axis of rotation and wherein the collection and separation bag and the first component bag may be supported relative to the axis of rotation such that the centrifugal field causes the separation of whole blood placed in the collection and separation bag into at least two components of blood defining an interface between said components that is normal to the line of symmetry and further causes a flow of at least one of the components of blood from the collection and separation bag through the tubing into the first component bag when the first valve is in the open position; and
   a controller operably coupled to the sensor and the first valve.

2. The system according claim 1 further comprising:
   a second component bag suitable for containing a component of blood, forming an opening, and wherein the tubing is connected between the opening of the collection and separation bag and the second component bag and further comprises a third tubing segment, said third tubing segment connected between the first tubing segment and the opening of the second component bag;
   a second valve aligned with the third tubing segment selectively controllable to seal the third tubing segment when the second valve is in a closed position and unseal the tubing segment when the second valve is in an open position; and
   wherein the controller is operably coupled to the sensor and the second valve and the centrifuge further comprises a pocket suitable for supporting the second component bag relative to the axis of rotation such that the second component bag is positioned substantially further from the axis of rotation than the collection and separation bag and such that the centrifugal field causes a flow of at least one of the components of blood from the collection and separation bag through the tubing into the second component bag when the second valve is in the open position.

3. The system according to claim 1 wherein the sensor is an optical sensor.

4. The system according to claim 1 wherein the controller is operably connected to the centrifuge.

5. An automated blood component separation system comprising:
   a collection and separation bag suitable for containing blood, forming an opening such that blood may be introduced into the collection and separation bag and removed from the collection and separation bag, said collection and separation bag having a conical shape that tapers toward said opening and further defining a line of symmetry;
   a first component bag suitable for containing a component of blood, forming an opening;
   tubing connected between the opening of the collection and separation bag to the opening of the component bag, said tubing comprising a first and second tubing segment wherein the first tubing segment is connected between the opening of the collection and separation bag and the second tubing segment, and the second tubing segment is connected between the first tubing segment and the opening of the first component bag;
   a first valve aligned with the second tubing segment selectively controllable to seal the second tubing segment when the first valve is in a closed position and unseal the second tubing segment when the first valve is in an open position;
   a sensor capable of detecting an interface between separated components of blood positioned along the first tubing segment near the opening of the collection and separation bag;
   a centrifuge capable of creating a centrifugal field around an axis of rotation, comprising a support structure that forms at least one cup defining an opening, an interior portion, and an interior base appropriate for supporting the collection and separation bag in the cup such that the opening of the collection and separation bag is directed toward the axis of rotation, and at least one adjacent pocket suitable for supporting the first component bag;
   an expresser movably engaged in the interior portion of the cup such that the collection and separation bag may be positioned between the expresser and the base of the cup; and wherein the collection and separation bag and the first component bag may be supported relative to the axis of rotation such that the centrifugal field causes the separation of whole blood placed in the collection and separation bag into at least two components of blood defining an interface between said components that is normal to the line of symmetry, and further causes the expresser to move away from the axis of rotation, whereby the collection and separation bag is compressed, creating a flow of at least one of the components of blood from the collection and separation bag through the tubing into the first component bag when the first valve is in the open position; and a controller operably coupled to the sensor and the first valve.

6. The system according claim 5 further comprising:

a second component bag suitable for containing a component of blood, forming an opening, and wherein the tubing is connected between the opening of the collection and separation bag and the second component bag and further comprises a third tubing segment, said third tubing segment connected between the first tubing segment and the opening of the second component bag;

a second valve aligned with the third tubing segment selectively controllable to seal the third tubing segment when the second valve is in a closed position and unseal the tubing segment when the second valve is in an open position; and wherein the controller is operably coupled to the sensor and the second valve and the centrifuge further comprises a pocket suitable for supporting the second component bag relative to the axis of rotation such that the second component bag is positioned substantially further from the axis of rotation than the collection and separation bag and such that the centrifugal field causes a flow of at least one of the components of blood from the collection and separation bag through the tubing into the second component bag when the second valve is in the open position.

7. The system according to claim 5 wherein the sensor is an optical sensor.

8. The system according to claim 5 wherein the controller is operably connected to the centrifuge.

9. The system according to claim 1 further comprising a sealable attachment tube connected with the first tubing segment whereby blood may be introduced into the collection and separation bag.

10. The system according to claim 5 further comprising a sealable attachment tube connected with the first tubing segment whereby blood may be introduced into the collection and separation bag.

11. The system according to claim 5 wherein the expresser includes a contact surface that contacts the collection and separation bag during compression such that the contact surface has a conical shape approximately corresponding to the conical shape defined by the collection and separation bag.

12. The system according to claim 11 wherein the interior base has a conical shape approximately corresponding to the conical shape defined by the collection and separation bag.

13. A method for separating blood components comprising the steps of:

placing blood into a collection and separation bag that forms an opening and having a conical shape that tapers toward said opening, and further defines a line of symmetry;

creating a first tubular connection between the collection and separation bag and a first component bag;

sealing the first tubular connection;

placing the first component bag and the collection and separation bag in a centrifuge having an axis of rotation;

centrifuging the first component bag and the collection and separation bag such that the blood in the collection and separation bag separates into at least two components that define a first interface that is normal to the line of symmetry;

automatically unsealing the first tubular connection while centrifuging;

forcing a flow approximately parallel to the line of symmetry of at least a first component from the collection and separation bag into the first component bag while centrifuging;

automatically monitoring the interface between the components;

sealing the first tubular connection in response to the first interface to stop the flow to the first component bag when the first interface reaches a designated point.

14. The method described in claim 13 wherein the placing step further comprises:

placing the first component bag in the centrifuge such that the first component bag is substantially further from the axis of rotation than the collection and separation bag and the opening is directed towards the axis of rotation.

15. The method described in claim 13 wherein the forcing step further comprises:

compressing the bag along the line of symmetry.

16. The method described in claim 13 wherein:

the creating step further includes creating a second tubular connection between the collection and separation bag and a second component bag;

the sealing step further includes sealing the second tubular connection;

the placing step further includes placing the second component bag in the centrifuge;

the centrifuging step further includes centrifuging the second component bag;

and further including the steps of:

automatically unsealing the second tubular connection while centrifuging;

forcing a flow approximately parallel to the line of symmetry of at least a second component from the collection and separation bag into the first component bag while centrifuging;

automatically unsealing the second tubular connection while centrifuging;

forcing a flow approximately parallel to the line of symmetry of at least the second component from the collection and separation bag into the second component bag while centrifuging;

sealing the second tubular connection in response to the interface to stop the flow to the second component bag when a predetermined condition is met.

17. The method described in claim 16 wherein the forcing step further comprises:

compressing the bag along the line of symmetry.

18. The method described in claim 13 further including the step of:

placing a blood storage solution in the first component bag.

19. The method described in claim 16 further including the step of:

placing a blood storage solution in the first component bag.

20. The system described in claim 1 wherein the first component bag is partially filled with a blood storage solution.

21. The system described in claim 5 wherein the first component bag is partially filled with a blood storage solution.

22. The system described in claim 1 wherein the diameter of the tubing is such that the flow of the first component from the separation and collection bag to the first component bag is restricted to a rate of 20 to 60 seconds per unit.

23. The system described in claim 5 wherein the diameter of the tubing is such that the flow of the first component from the separation and collection bag to the first component bag is restricted to a rate of 20 to 60 seconds per unit.

24. The method described in claim 13 wherein the forcing step further includes restricting the flow to a rate of 20 to 60 seconds per unit.

* * * * *